(12) United States Patent
Wei et al.

(10) Patent No.: US 9,401,637 B2
(45) Date of Patent: Jul. 26, 2016

(54) SWITCHING REGULATOR WITH ADAPTIVE PWM/PFM MODULATOR

(71) Applicant: Alpha and Omega Semiconductor Incorporated, Sunnyvale, CA (US)

(72) Inventors: Zhinan Wei, San Jose, CA (US); Zhiye Zhang, San Jose, CA (US); Allen Chang, Fremont, CA (US)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 93 days.

(21) Appl. No.: 13/801,755

(22) Filed: Mar. 13, 2013

(65) Prior Publication Data

US 2014/0266090 A1   Sep. 18, 2014

(51) Int. Cl.
*G05F 1/00* (2006.01)
*H02M 3/156* (2006.01)
*H02M 1/00* (2006.01)

(52) U.S. Cl.
CPC ........ *H02M 3/156* (2013.01); *H02M 2001/008* (2013.01)

(58) Field of Classification Search
CPC ... H02M 3/156; H02M 3/1563; H02M 3/157; H02M 3/158; H02M 3/1582; H02M 3/1588; H02M 3/1584; H02M 2001/008; H02M 2001/0032; H02M 2003/1566; G05F 1/595
USPC ......... 323/222–226, 271–275, 281–288, 351; 327/172–177; 375/237–239; 332/112
See application file for complete search history.

(56) References Cited

U.S. PATENT DOCUMENTS

| | | | |
|---|---|---|---|
| 4,940,929 A | 7/1990 | Williams | |
| 5,336,985 A | 8/1994 | McKenzie | |
| 5,481,178 A | 1/1996 | Wilcox et al. | |
| 5,548,206 A | 8/1996 | Soo | |
| 6,366,070 B1 * | 4/2002 | Cooke et al. | 323/284 |
| 7,245,113 B2 | 7/2007 | Chen et al. | |
| 7,446,519 B2 | 11/2008 | Low et al. | |
| 7,541,788 B2 * | 6/2009 | Katoh et al. | 323/282 |
| 7,609,042 B2 | 10/2009 | Kokubun et al. | |
| 8,791,724 B1 * | 7/2014 | Huang et al. | 327/108 |
| 2006/0273772 A1 | 12/2006 | Groom | |
| 2009/0218999 A1 | 9/2009 | Kikuchi | |
| 2013/0077349 A1 * | 3/2013 | Jin et al. | 363/15 |

OTHER PUBLICATIONS

Ken Marasco, "How to Apply DC-to-DC Step-Down (Buck) Regulators Successfully", Analog Dialogue 45-06 Back Burner, Jun. 2011, pp. 1-4.

* cited by examiner

*Primary Examiner* — Timothy J Dole
*Assistant Examiner* — Carlos Rivera-Perez
(74) *Attorney, Agent, or Firm* — Van Pelt, Yi & James LLP

(57) ABSTRACT

A switching regulator controller for a buck switching regulator incorporates a multi-mode adaptive modulator configured to automatically select between a first operation mode and a second operation mode as a function of the output voltage being generated. In one embodiment, the switching regulator controller compares the output voltage to a comparator reference voltage and is configured to operate in a selected operation mode based on the output voltage. In this manner, a single switching regulator controller can be used in multiple instances of an electronic system to supply circuitry that may have different operational requirements. In one embodiment, the switching regulator controller is configured to operation in a PWM/PFM mode and a PWM mode as a function of the output voltage, which indicates the circuit application to which the switch regulator controller is used to supply.

9 Claims, 3 Drawing Sheets

SWITCHING REGULATOR WITH ADAPTIVE PWM/PFM MODULATOR

BACKGROUND OF THE INVENTION

Many consumer electronic appliances, such as television set top boxes and remote control devices, are implemented as electronic systems incorporating integrated circuits. These electronic systems typically include integrated circuits forming the core digital logic circuitry and integrated circuits forming the input/output (I/O) interface circuitry. Conventional electronic systems employ multiple DC-to-DC converters to convert a main bus voltage from a power source supplying the system to one or more voltages necessary for driving these integrated circuits.

Switch mode power supplies or switching regulators, also referred to as DC to DC converters, are used to convert an input supply voltage to a desired output voltage at a voltage level appropriate for integrated circuits in an electronic system. For example, a 12 volts supply voltage provided to an electronic system may need to be reduced to 5 volts for supplying the I/O interface circuits and reduced to 1V for supplying the core digital logic circuits, especially if the core digital logic circuits are built using deep sub-micron integrated circuits. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

Government agencies have started to implement standby power regulations, requiring that appliances with standby power function use no more than 1 watt of power in their standby power consuming mode. These "green" regulations require electronic appliances to have high power efficiency with low standby power consumption. Power efficiency is a measure of the fraction of power consumed which achieves functionality, rather than waste heat.

When switching regulators are incorporated in electronic systems, standby power regulations demand high efficiency from the switching regulators when in standby mode, such as greater than 80% when drawing 10 mA at 5V during standby. Switching regulators are designed to deliver peak efficiency when driving some specific "normal" load. Switching regulators lose efficiency when operated in a wide range of load conditions, and the most drastic degradation occurs at light load conditions. Thus, it is often difficult for switching regulators to meet the standby power requirements in light load conditions.

In an electronic system including a digital core circuit and an I/O interface circuit, the digital core circuit typically demands high current but operates at a low power supply voltage (e.g. 1V) while the I/O interface circuit typically requires lower current but operates at a higher power supply voltage (e.g. 5V or 3.3V).

The digital core circuit requires a power supply capable of fast load transient response to handle varying load current transitions quickly. Since the digital core is typically turned off during standby mode, the efficiency of the digital core power supply is not critical for the standby regulations. Therefore, a DC-to-DC converter capable of fast load transient is typically selected, regardless of the converter's power efficiency at light load. In most cases, a pulse width modulation (PWM) switching regulator is used to supply the digital core circuit.

On the other hand, the I/O interface circuit remains turned on during the standby mode of operation. Thus, the I/O interface circuit requires a power supply capable of delivering high efficiency to a normal load as well as to a light load. In order to meet the requirements of the "green" regulations, a power supply for the I/O interface circuit needs to have high efficiency at the light load condition when the system is in standby mode. In most cases, a pulse frequency modulation (PFM) switch regulator is desired for high efficiency light load operation.

Accordingly, to optimize both the performance requirement and the power efficiency demand of an electronic system, an electronic system may end up being designed to use different types of switching regulators for the digital core circuit and the I/O interface circuit. A manufacturer of an electronic system thus have to procure multiple DC-to-DC converter solutions, rendering the design and manufacturing process more complex and less cost effective.

BRIEF DESCRIPTION OF THE DRAWINGS

Various embodiments of the invention are disclosed in the following detailed description and the accompanying drawings.

DETAILED DESCRIPTION

Figure 1:
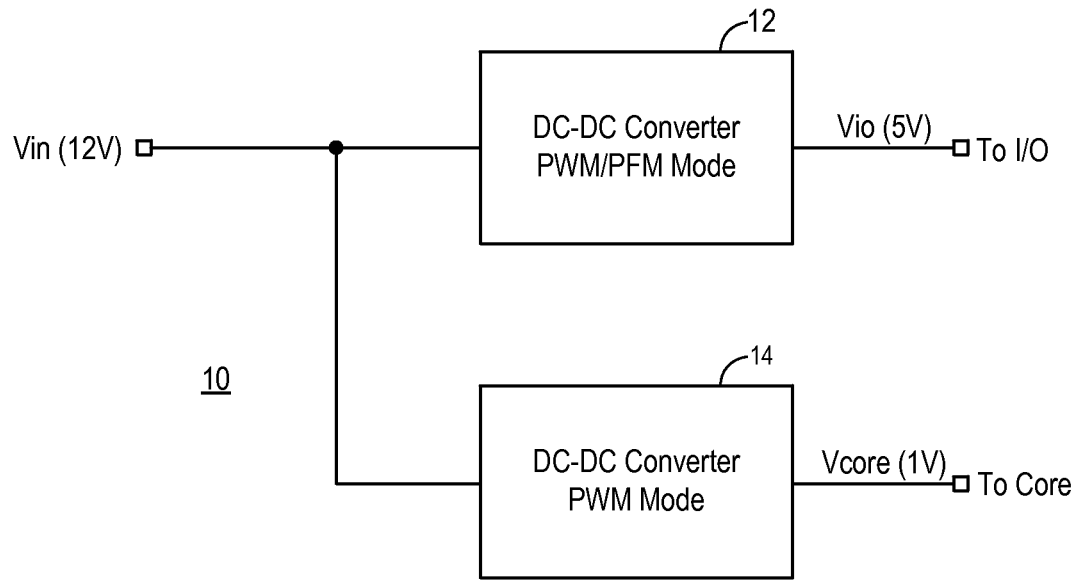
FIG. 1 is a block diagram illustrating the power supply configuration in a conventional electronic system.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, an adaptive switching regulator controller incorporates a multi-mode adaptive modulator configured to automatically select between a first modulation mode and a second modulation mode as a function of the output voltage being generated. In embodiments of the present invention, the adaptive switching regulator controller is used to form a switching regulator or a DC-to-DC converter which receives an input voltage and generates an output voltage driving a load. The adaptive switching regulator controller monitors the output voltage generated by the DC-to-DC converter and automatically configures the adaptive modulator to operate in a selected operation mode based on the output voltage. In this manner, a single switching regulator controller can be used in multiple instances of an electronic system to supply circuitry that may have different operational requirements.

In one embodiment, the adaptive switching regulator controller incorporates an adaptive PWM/PFM modulator which can be automatically configured to operate in a PWM modulation mode or a PFM modulation mode based on the output voltage being generated. The PWM mode is selected when the output voltage indicates the circuitry to be supplied requires fast transient response and the PFM mode is selected when the output voltage indicates the circuitry to be supplied requires high efficiency at light load conditions.

The adaptive switching regulator controller of the present invention provides many advantages over conventional solutions. In particular, the adaptive switching regulator controller can be used for either fast transient or light load requirements. Thus, a single switching regulator controller can be used in an electronic system to drive either the core circuitry or the interface I/O circuitry. The adaptive switching regulator controller simplifies system design and reduces cost. More specifically, the adaptive switching regulator of the present invention enables a single switching regulator controller device to be applied for all the power supply needed in an entire electronic system. This simplifies the logistic and improves operational efficiency for manufacturers of electronic systems.

FIG. 1 is a block diagram illustrating the power supply configuration in a conventional electronic system. Referring to FIG. 1, an electronic system 10 receives a 12V input as the input voltage Vin. The input voltage Vin needs to be stepped down to drive various circuitries in the system. For example, digital core circuitry requires a 1V power supply Vcore while input/output (I/O) interface circuitry requires a 5V power supply Vio. The digital core circuitry typically requires fast transient response. Thus, a DC-to-DC converter 14 implementing the pulse-width modulation (PWM) mode is typically used to generate the core power supply Vcore. However, a DC-to-DC converter with PWM modulator typically has poor light load efficiency.

For the I/O interface circuitry, a DC-to-DC converter 12 implementing dual PWM mode or PWM/PFM mode is often used. The DC-to-DC converter 12 operates in the PWM mode to deliver high efficiency when the load condition is medium to heavy. The DC-to-DC converter 12 operates in the PFM (pulse frequency modulation) mode to deliver high efficiency when the load condition is light. The transition between PFM mode in light load and PWM mode in heavy load is not fast. However, typical loading at the I/O interface circuit do not vary very fast and thus can tolerate the slow transient response between PFM and PWM modes.

As thus configured, the electronic system 10 requires two different types of DC-to-DC converters in order to meet the requirements of fast transient response for the core circuitry and the green regulation of high efficiency in standby for the I/O interface circuitry. The logistic for manufacturing electronic system 10 becomes more complex.

Figure 2:
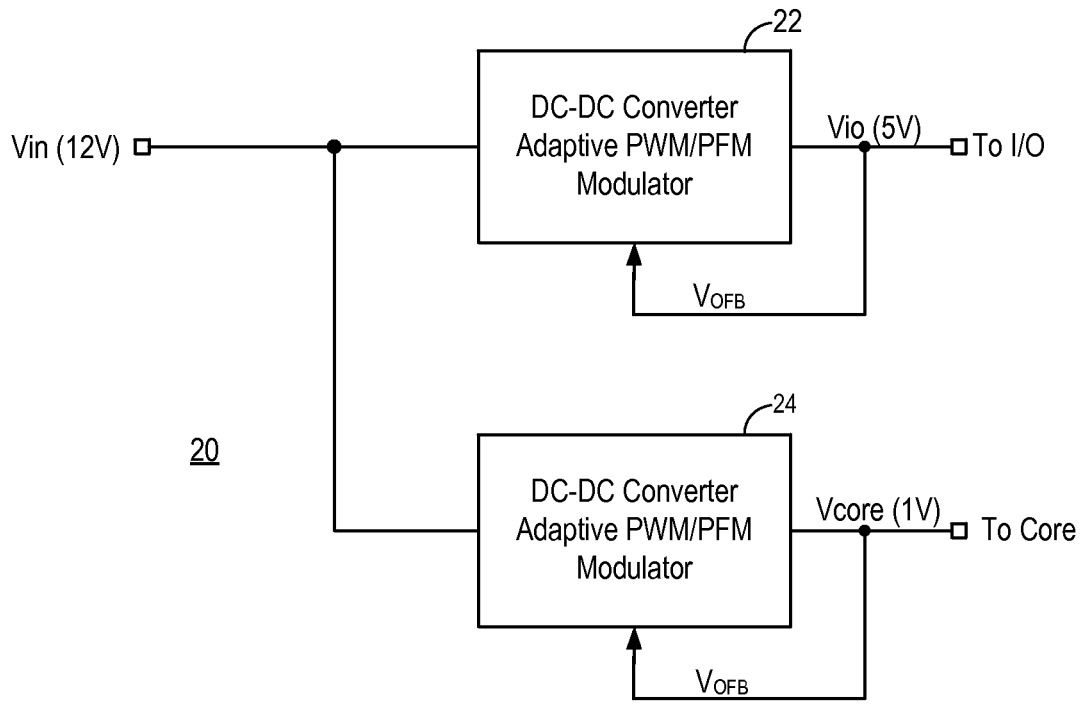
FIG. 2 is a block diagram illustrating a power supply configuration in an electronic system incorporating DC-to-DC converters constructed using the adaptive switching regulator controller in embodiments of the present invention.

FIG. 2 is a block diagram illustrating a power supply configuration in an electronic system incorporating DC-to-DC converters constructed using the adaptive switching regulator controller in embodiments of the present invention. Referring to FIG. 2, an electronic system 20 receives an input voltage Vin (e.g. 12V). The electronic system 20 includes digital core circuitry to be supplied by a core power supply Vcore (e.g. 1V) and input/output (I/O) interface circuitry to be supplied by an I/O power supply Vio (e.g. 5V). The electronic system 20 thus employs two DC-to-DC converters 22, 24 to convert the input voltage Vin to the required internal voltages Vcore and Vio. In embodiments of the present invention, the DC-to-DC converters 22, 24 are each implemented using the adaptive switching regulator controller with an adaptive PWM/PFM modulator. The same adaptive switching regulator controller is used to form the DC-to-DC converter 22 configured to generate the I/O supply voltage Vio and to form the DC-to-DC converter 24 configured to generate the core supply voltage Vcore. The output voltage generated by each of the DC-to-DC converter 22, 24 is fed back, as an output feedback voltage $V_{OFB}$, to the adaptive switching regulator controller to configure the adaptive PWM/PFM modulator to operate in a desired modulation mode for the circuitry it is supplying.

For example, when the output voltage is the I/O supply voltage Vio, the voltage Vio (e.g. 5V) is fed back to the adaptive switching regulator controller in the DC-to-DC converter 22 to configure the PWM/PFM modulator to operate in the dual PWM/PFM mode. In this manner, high efficiency at heavy or medium load is achieved using PWM modulation while high efficiency at light load is achieved using PFM modulation.

On the other hand, when the output voltage is the core supply voltage Vcore, the voltage Vcore (e.g. 1V) is fed back to the adaptive switching regulator controller in the DC-to-DC converter 24 to configure the PWM/PFM modulator to operate in the PWM mode. In this manner, high efficiency and fast transient response is achieved while the core circuitry is being operated. The core circuitry, including the DC-to-DC converter 24, is disabled when the electronic system 30 enters the standby mode. Therefore, light load efficiency for the DC-to-DC converter 24 is not relevant as the circuit is not enabled during light load standby conditions.

In one embodiment, the adaptive switching regulator controller uses a comparator to compare the output feedback voltage $V_{OFB}$ to a reference voltage to select the desired operation mode. For instance, because digital core circuitry typically requires a very low supply voltage (e.g. 1V) and the I/O interface circuit typically requires a higher supply voltage (e.g. 5V). The adaptive switching regulator controller compares the output feedback voltage $V_{OFB}$ to a reference voltage of 3V to determine if the controller is being configured to drive core circuitry or I/O interface circuitry. When the output feedback voltage $V_{OFB}$ is less than the reference voltage, the controller recognizes that the switching regulator is being configured to drive digital core circuitry and will select the PWM mode. When the output feedback voltage $V_{OFB}$ is greater than the reference voltage, the controller recognizes that the switching regulator is being configured to drive I/O interface circuitry and will select the PWM/PFM mode.

Figure 3:
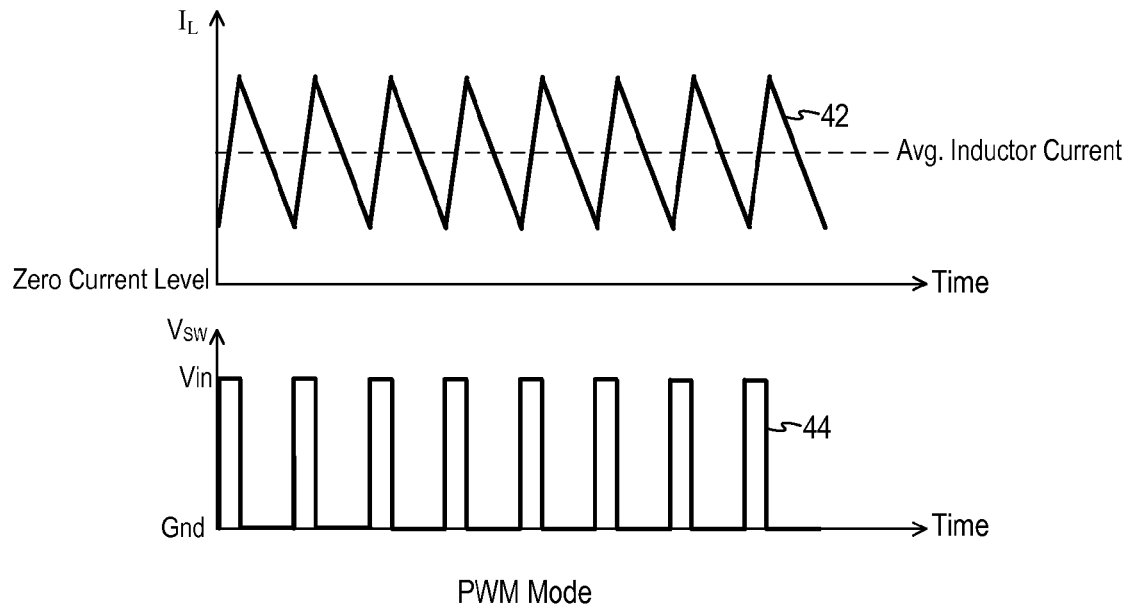
FIG. 3 illustrates the switching output voltage of a switching regulator controller and the corresponding inductor current when operated in the PWM mode and the PFM mode.
Figure 3:
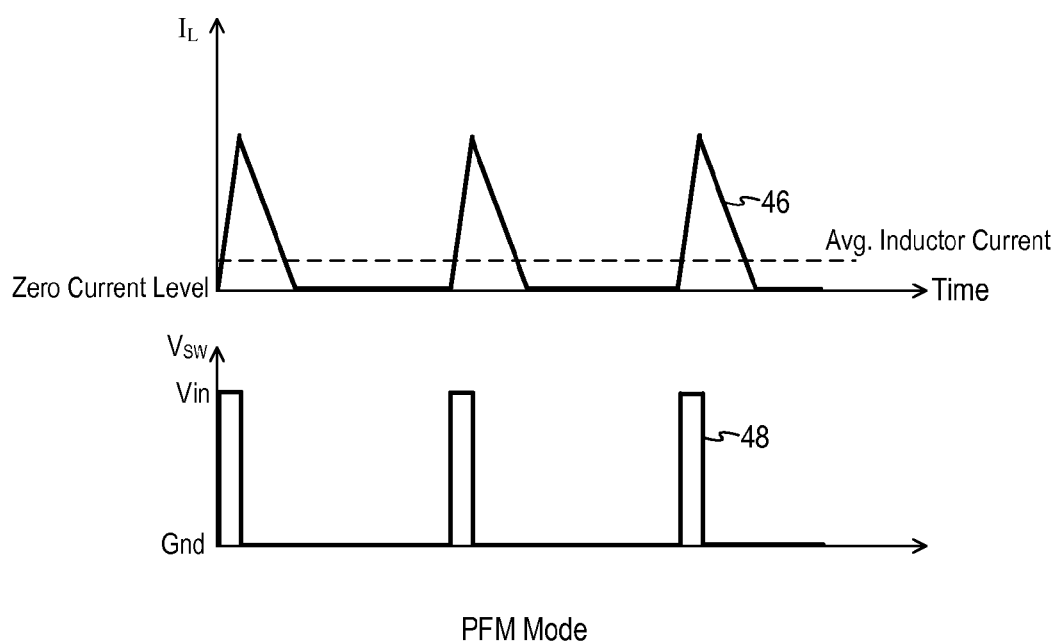

FIG. 3 illustrates the switching output voltage of a switching regulator controller and the corresponding inductor current when operated in the PWM mode and the PFM mode. The PWM mode implements continuous conduction where the switching output voltage $V_{SW}$ (curve 44) switches continuously to generate a linear ramp inductor current $I_L$ (curve 42). The switching output voltage switches continuously whether in heavy load or light load. Thus, the PWM mode gives very fast transient response but very poor efficiency at light load.

The PFM mode implements discontinuous conduction where the switching output voltage $V_{SW}$ (curve 48) switches at reduced frequency and the inductor current $I_L$ (curve 46) loses the linear ramp characteristics. The reduced switching frequency improves efficiency at light load condition but suffers from poor transient response as the PFM modulator takes time to respond to changing load conditions.

Figure 4:
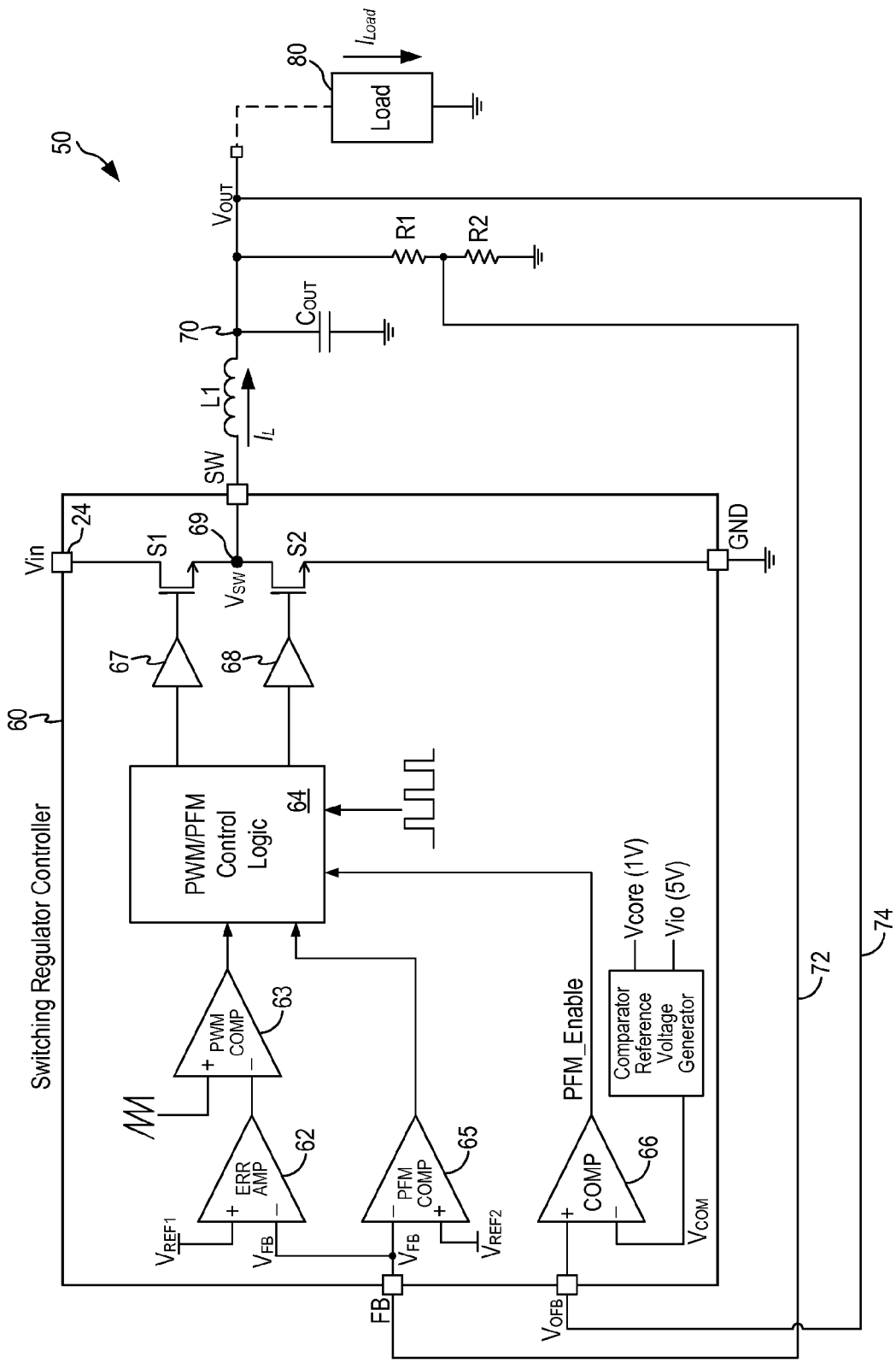
FIG. 4 is a schematic diagram illustrating an adaptive switching regulator controller incorporated in a DC-to-DC converter in embodiments of the present invention.

FIG. 4 is a schematic diagram illustrating an adaptive switching regulator controller incorporated in a DC-to-DC converter in embodiments of the present invention. Referring to FIG. 4, a buck switching regulator 50 includes an adaptive switching regulator controller 60 ("controller 60") including a pair of power switches S1 and S2 connected in series between the input voltage Vin and a ground potential. Power switches S1 and S2 are alternately turned on and off to generate a switching output voltage $V_{SW}$ at a switch node (SW) 69. The switching output voltage $V_{SW}$ is directly coupled to an LC filter circuit including an output inductor L1 and an output capacitor C1 to generate a regulated output voltage $V_{OUT}$ at a node 70 having a substantially constant magnitude. The output voltage $V_{OUT}$ can then be used to drive a load 80.

In the present illustration, the controller 60 is as an integrated circuit. The power switches are formed on the integrated circuit as controller 60 while the output inductor L1 and the output capacitor C1 are formed as off-chip discrete components. In other embodiments, the power switches and the output inductor/output capacitor may be formed on-chip or off-chip of the controller integrated circuit. The exact level of integration of the buck switching regulator 50 is not critical to the practice of the present invention.

Switching regulator 50 includes a feedback control circuit to regulate the energy transfer to the LC filter circuit to maintain a constant output voltage within the desired load limits of the circuit. More specifically, the feedback control circuit causes power switches S1 and S2 to turn on and off to regulate the output voltage $V_{OUT}$ to be equal to a reference voltage or to a voltage value related to the reference voltage. In the present embodiment, a voltage divider including resistors R1 and R2 is used to divide down the output voltage $V_{OUT}$ which is then fed back to the controller 60 as a feedback voltage $V_{FB}$ on a feedback node 72. Furthermore, to implement mode selection, the output voltage $V_{OUT}$ is also fed back to the controller 60 as an output feedback voltage $V_{OFB}$ on a feedback node 74.

The controller 60 includes an error amplifier 62 receiving the feedback voltage $V_{FB}$ and a reference voltage $V_{REF1}$. The output voltage from the error amplifier 62 is provided to a PWM comparator 63 to be compared with a ramp signal. The output of PWM comparator 63 is a PWM control signal coupled to a PWM/PFM control logic circuit 64. Error amplifier 62 and PWM comparator 63 are used in the PWM modulation mode for feedback control.

The controller 60 also includes a PFM comparator 65 receiving the feedback voltage $V_{FB}$ and a reference voltage $V_{REF2}$. The output of PFM comparator 65 is a PFM control signal coupled to the PWM/PFM control logic circuit 64. PFM comparator 65 is used in the PFM modulation mode for feedback control.

The PWM/PFM control logic circuit 64 may further receive a clock signal as input. The PWM/PFM control logic circuit 64 generates gate drive signals which are provided to a high-side driver circuit 67 and a low-side driver circuit 68 to drive the high-side power switch S1 and the low-side power switch S2, respectively. In some embodiments, the gate drive signals are complementary signals. The control logic circuit 64 turns on and off the high-side power switch S1 when triggered by the control signal from the PWM comparator 63 or the PFM comparator 65.

Finally, the controller 60 also includes a comparator 66 receiving the output feedback voltage $V_{OFB}$ and a comparator reference voltage $V_{COM}$. The comparator 66 generates a PFM_Enable signal which is coupled to the PWM/PFM control logic circuit 64. The comparator 66 asserts the PFM_Enable signal when the output feedback voltage $V_{OFB}$ is greater than the comparator reference voltage $V_{COM}$. The PFM_Enable signal is otherwise deasserted. In some embodiments, when the PFM_Enable signal is asserted, the PWM/PFM control logic circuit 64 is configured to operate in the PWM/PFM mode. That is, the PFM mode is enabled. When the PFM_Enable signal is deasserted, the PWM/PFM control logic circuit 64 is configured to operate in the PWM mode. That is, the PFM mode is disabled.

In some embodiments, the PWM mode can be implemented as a constant frequency PWM mode or as a variable frequency constant ON time or constant OFF time PWM mode.

In some embodiments, the comparator reference voltage $V_{COM}$ has a voltage value between 2V and 3V. In one embodiment, the comparator reference voltage $V_{COM}$ has a voltage value of 3V or 2.7V which is useful in electronic systems with core circuitry running at 1V and I/O interface circuitry running at 5V. A comparator reference voltage $V_{COM}$ of 3V or 2.7V can readily discern whether the switching regulator 50 is configured to supply the core circuitry or to supply the I/O interface circuit. The PWM/PFM control logic circuit 64, in response to the PFM_Enable signal, configures the controller 60 to operate in the appropriate modulation mode for the circuitry being supplied.

In one embodiment, when the output feedback voltage $V_{OFB}$ is greater than the comparator reference voltage $V_{COM}$, the switching regulator 50 is configured to provide the power supply voltage for I/O interface circuitry of an electronic system. The PFM_Enable signal is asserted and the controller 60 is configured to operate in the PWM/PFM mode for high efficiency during heavy load using PWM mode and for high efficiency during light load using PFM mode.

On the other hand, when the output feedback voltage $V_{OFB}$ is less than the comparator reference voltage $V_{COM}$, the switching regulator 50 is configured to provide the power supply voltage for digital core circuitry of an electronic system. The PFM_Enable signal is deasserted and the controller 60 is configured to operate only in the PWM mode for high efficiency and fast transient response as needed when supplying core circuitry.

As thus configured, the same switching regulator controller 60 can be used in separate instances in an electronic system to generate the supply voltages for different circuitry. Manufacturers of electronic systems do not need to stock different types of switching regulators or switching regulator controllers. The unified switching regulator design enabled by the adaptive switching regulator controller of the present invention reduces manufacturing cost and design complexity.

In the embodiment shown in FIG. 4, the output voltage $V_{OUT}$ is fed back directly to controller 60 as the output feedback voltage to be compared with the comparator reference voltage $V_{COM}$. In other embodiments, the output voltage $V_{OUT}$ may be stepped down to generate an output feedback voltage that is related to the output voltage $V_{OUT}$.

Furthermore, in the above described embodiments, the adaptive switching regulator controller 60 is configured to operate in either the PWM mode or the PWM/PFM mode. In other embodiments, the adaptive switching regulator controller 60 is configured to operate in a first operation mode optimized for light load efficiency in standby mode and in a second operation mode optimized for fast transient response. In other embodiments, the adaptive switching regulator controller 60 may be configured using any set of operation modes desired for an electronic system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A switching regulator controller for a buck switching regulator, the buck switching regulator receiving an input voltage and controlling a high-side switch and a low-side switch using a feedback control loop to generate a switching output voltage, the switching output voltage being applied to an LC filter circuit to generate a regulated output voltage having a substantially constant magnitude on an output node, the switching regulator controller comprising:

a comparator configured to receive a first feedback voltage indicative of the regulated output voltage and a comparator reference voltage, the comparator generating a select signal being asserted in response to the first feedback voltage being greater than the comparator reference voltage and being deasserted in response to the first feedback voltage being less than the comparator reference voltage, wherein the first feedback voltage is the regulated output voltage and the comparator reference voltage is selected to have a voltage value between a first positive power supply voltage used for core circuitry and a second positive power supply voltage used for input-output interface circuitry, the first positive power supply voltage being less than the second positive power supply voltage; and a control circuit configured to receive a second feedback voltage indicative of the regulated output voltage and also to receive the select signal, the control circuit configured to operate in a first operation mode comprising a dual PWM/PFM mode or a second operation mode comprising a PWM mode in response to the select signal, the control circuit being configured to operate in a selected operation mode to generate gate drive signals for controlling the high-side switch and the low-side switch, wherein in response to the determination of the comparator, the select signal is asserted to configure the control circuit to operate in the first operation mode using the dual PWM/PFM mode to generate the regulated output voltage indicative of the second positive power supply voltage used for input-output interface circuitry, and in response to the determination of the comparator, the select signal is deasserted to configure the control circuit to operate in the second operation mode using the PWM mode to generate the regulated output voltage indicative of the first positive power supply voltage used for core circuitry; and wherein the control circuit is operated in the dual PWM/PFM mode of the first operation mode by using the PWM mode during a heavy or medium load condition and by using the PFM mode during a light load condition to generate the regulated output voltage indicative of the second positive power supply voltage used for input-output interface circuitry; and wherein in response to the selection of the first operation mode, the control circuit remains in the first operation mode without transitioning to the second operation mode in response to the regulated output voltage being indicative of the second positive power supply voltage used for input-output interface circuitry as indicated by the select signal being asserted and;

wherein in response to the selection of the second operation mode, the control circuit remains in the second operation mode without transitioning to the first operation mode in response to the regulated output voltage being indicative of the first positive power supply voltage used for core circuitry as indicated by the select signal being deasserted.

2. The switching regulator controller of claim 1, wherein the select signal comprises an enable signal for the PFM mode, the enable signal being asserted to enable the PFM mode with the PWM mode in the first operation mode and the enable signal being deasserted to disable the PFM mode and to only use the PWM mode in the second operation mode.

3. The switching regulator controller of claim 1, wherein the comparator reference voltage comprises a voltage value between 2V and 3V.

4. The switching regulator controller of claim 1, wherein the control circuit comprises:

an error amplifier configured to receive the second feedback voltage and a first reference voltage, the error amplifier generating an error output value;

a PWM comparator configured to receive the error output value and a ramp signal, the PWM comparator generating a PWM control signal;

a PFM comparator configured to receive the second feedback voltage and a second reference voltage, the PFM comparator generating a PFM control signal; and a PWM/PFM control logic circuit configured to receive the PWM control signal, the PFM control signal and the select signal, the PWM/PFM control logic circuit generating the gate drive signals for the high-side switch and the low-side switch.

5. The switching regulator controller of claim 1, wherein the control circuit is configured to operate in the PFM mode optimized for light load efficiency in standby mode and in the PWM mode optimized for fast transient response.

6. The switching regulator controller of claim 5, wherein the select signal is asserted to select the first operation mode to use the PFM mode for light load efficiency in standby mode in response to the first feedback voltage being greater than the comparator reference voltage; and the select signal is deasserted to select the second operation mode to use the PWM mode for fast transient response in response to the first feedback voltage being less than the comparator reference voltage.

7. A method in a switching regulator controller for a buck switching regulator, the buck switching regulator receiving an input voltage and controlling a high-side switch and a low-side switch using a feedback control loop to generate a switching output voltage, the switching output voltage being applied to an LC filter circuit to generate a regulated output voltage having a substantially constant magnitude on an output node, the method comprising:

comparing a first feedback voltage indicative of the regulated output voltage and a comparator reference voltage, wherein the first feedback voltage is the regulated output voltage and the comparator reference voltage is selected to have a voltage value between a first positive power supply voltage used for core circuitry and a second positive power supply voltage used for input-output interface circuitry, the first positive power supply voltage being less than the second positive power supply voltage;

generating a select signal being asserted in response to the first feedback voltage being greater than the comparator reference voltage and being deasserted in response to the first feedback voltage being less than the comparator reference voltage;

receiving a second feedback voltage indicative of the regulated output voltage;

selecting a first operation mode comprising a dual PWM/PFM mode in response to the select signal being asserted;

selecting a second operation mode comprising a PWM mode in response to the select signal being deasserted;

generating gate drive signals for controlling the high-side switch and the low-side switch;

in response to the first operation mode being selected, generating using the dual PWM/PFM mode the regulated output voltage indicative of the second positive power supply voltage used for input-output interface circuitry, wherein generating the regulated output voltage using the dual PWM/PFM mode comprises generating the regulated output voltage using the PWM mode during a heavy or medium load condition and generating the regulated output voltage using the PFM mode during a light load condition;

in response to the second operation mode being selected, generating using the PWM mode the regulated output voltage indicative of the first positive power supply voltage used for core circuitry; and in response to the selection of the first operation mode, generating the regulated output voltage using the first operation mode without transitioning to the second operation mode in response to the regulated output voltage being indicative of the second positive power supply voltage used for input-output interface circuitry as indicated by the select signal being asserted and;

in response to the selection of the second operation mode, generating the regulated output voltage using the second operation mode without transitioning to the first second operation mode in response to the regulated output voltage being indicative of the first positive power supply voltage used for core circuitry as indicated by the select signal being deasserted.

8. The method of claim 7, wherein the select signal comprises an enable signal for the PFM mode, and the method comprises:

enabling the PFM mode in response to the select signal being asserted; and disabling the PFM mode in response to the select signal being deasserted.

9. The method of claim 7, wherein selecting a first operation mode in response to the select signal being asserted comprises selecting the PFM mode optimized for light load efficiency in standby mode in response to the select signal being asserted; and selecting a second operation mode in response to the select signal being deasserted comprises selecting the PWM mode optimized for fast transient response in response to the select signal being deasserted.

* * * * *